United States Patent [19]

Holloway, Jr. et al.

[11] Patent Number: 4,828,858
[45] Date of Patent: May 9, 1989

[54] PROCESS FOR HONEY ROASTING NUTS

[75] Inventors: Oris E. Holloway, Jr., Sparta, N.J.; Howard Wilkins, Brookfield, Conn.; Peter M. Gannis, Stamford, Conn.

[73] Assignee: Nabisco Brands, Inc., Parsippany, N.J.

[21] Appl. No.: 797,852

[22] Filed: Nov. 14, 1985

[51] Int. Cl.$^4$ .............................. A23L 1/36
[52] U.S. Cl. .................... 426/293; 426/296; 426/309; 426/438; 426/632
[58] Field of Search ............. 426/296, 293, 291, 309, 426/93, 632, 305, 629, 639, 303, 304, 307, 438, 89, 94, 103, 138

[56] References Cited

U.S. PATENT DOCUMENTS

| | | | |
|---|---|---|---|
| 4,161,545 | 7/1979 | Green | 426/93 |
| 4,501,758 | 2/1985 | Morris | 426/293 |
| 4,515,820 | 5/1985 | Tang | 426/309 |
| 4,522,833 | 6/1985 | Sharma | 426/93 |
| 4,647,463 | 3/1987 | Hoover | 426/307 |

*Primary Examiner*—Donald E. Czaja
*Assistant Examiner*—Carolyn Paden
*Attorney, Agent, or Firm*—Richard Kornutik

[57] ABSTRACT

Nuts (peanuts, cashews, etc.) having desirable eye appeal, excellent taste and good storage stability are prepared by coating raw nuts with an adhesive solution containing honey, followed by a coating of powdered sugar, roasting the coated nuts, preferably in oil, and then applying a coating of a dry mixture of sugar and salt. The adhesive solution employed in the initial coating step preferably comprises a mixture of honey, corn syrup, sucrose, carbohydrate gum and water. The final coating is tightly adherent after roasting.

24 Claims, 1 Drawing Sheet

PROCESS FOR HONEY ROASTING NUTS

BACKGROUND OF THE INVENTION

This invention relates to a process for preparing roasted, coated nuts and is more particularly concerned with a process for preparing honey-roasted nuts wherein the coating is tightly adherent and with the nuts so prepared.

A variety of goods, including nuts such as peanuts and cashews, and meats such as chicken and ham have been roasted, fried or otherwise cooked after coating with a honey-containing solution. Because the honey is in direct contact with the food, it serves to transfer heat from the heat source to the food (i.e., it is the heat transfer agent). Accordingly, these products are variously referred to as honey-fried, honey-baked, or honey-roasted. The present invention provides improvements in honey roasting nuts.

A recent U.S. Pat. No. 4,161,545 to Green et al describes the preparation of honey-roasted nuts by coating raw nuts with a mixture of water and honey, enrobing the coated nuts with a dry mixture containing about 84–92% by weight of sugar and about 8–16% by weight of starch, the particle size in the mixture being in the range of 0.002 inch to 0.02 inch, and then roasting the coated nuts using either oil or dry roasting conditions. It is stated that, in contrast to the use of adhesive solutions containing dextrose or corn syrup (which are said to give a dark brown color to the roasted nut) and coating solutions containing sucrose and dextrose (which are said to give a light colored roasted nut), the use of the honey-water coating solution gives a more appealing honey color and pleasant taste to the roasted nut.

More recently, U.S. Pat. No. 4,501,758 to Morris has stated that honey in liquid form is disadvantageous for use in coating nuts. To achieve a uniform coating which has a noticeable honey flavor and yet is suitably adhesive, Morris teaches a two-stage coating procedure which employs no honey in a first stage coating and honey in dry form in a second stage. Unfortunately, the use of dry honey has several disadvantages versus liquid honey, including its relatively high cost, its diminished concentration of some flavor notes, and its reduced adhesive power.

Yet more recently, U.S. Pat. No. 4,515,820 to Tong describes the preparation of honey-roasted nuts with a glazed surface appearance. The single stage coating process calls for coating nuts with an aqueous solution comprising 10–20% honey and 50–70% sucrose, and then drying and roasting. And, in U.S. Pat. No. 4,522,833, Sharma states that where honey coatings are applied prior to roasting, difficulties are encountered both with coating properties and product flavor. To correct for this, Sharma discloses applying a coating slurry after partial roasting, the coating containing only a low level of honey and requiring the presence of an oil to achieve desired flow properties.

In direct contrast to the teachings of the teachings of these patents, it has been found that a process, which is described in detail below and which includes the application of a coating comprising corn syrup and sucrose in addition to liquid honey prior to roasting, provides a roasted nut having highly advantageous properties including excelent adherence of the coating, eye appeal, flavor and storage stability, and that the inclusion of starch or dry honey in the final dry coating can be eliminated.

SUMMARY OF THE INVENTION

It is an object of this invention to provide honey-roasted, coated nuts having desirable eye appeal, texture and flavor.

It is a further object of this invention to provide honey-roasted nuts having a coating comprising a mixture of sweetening agents.

It is yet another object of this invention to provide a continuous process for the preparation of honey-roasted nuts having a tightly adherent coating, desirable eye appeal, texture and flavor, without the need for starch or dry honey in the outer coating.

These objects and other objects and advantages which will become apparent from the description which follows, are accomplished by the practice of this invention. Thus, in one aspect, the invention comprises a process for the provision of honey-roasted nuts including the steps of coating raw nuts with an aqueous solution comprising vegetable gum, sucrose, corn syrup and honey, thereafter applying a coating of dry particulate sugar to the previously coated nuts, subjecting the resulting coated nuts to roasting and thereafter applying a coating of a dry mixture of sugar and salt. The process of the invention provides the greatest improvements where roasting is achieved by immersing the nuts, coated as above, in hot edible oil.

In a particular and preferred embodiment, the above process of the invention is conducted on a continuous basis.

DESCRIPTION OF THE DRAWING

The invention will be better understood and its advantages will become more apparent from the following detailed description, especially when read in light of the attached drawing, wherein.

DETAILED DESCRIPTION OF THE INVENTION

Figure 1:
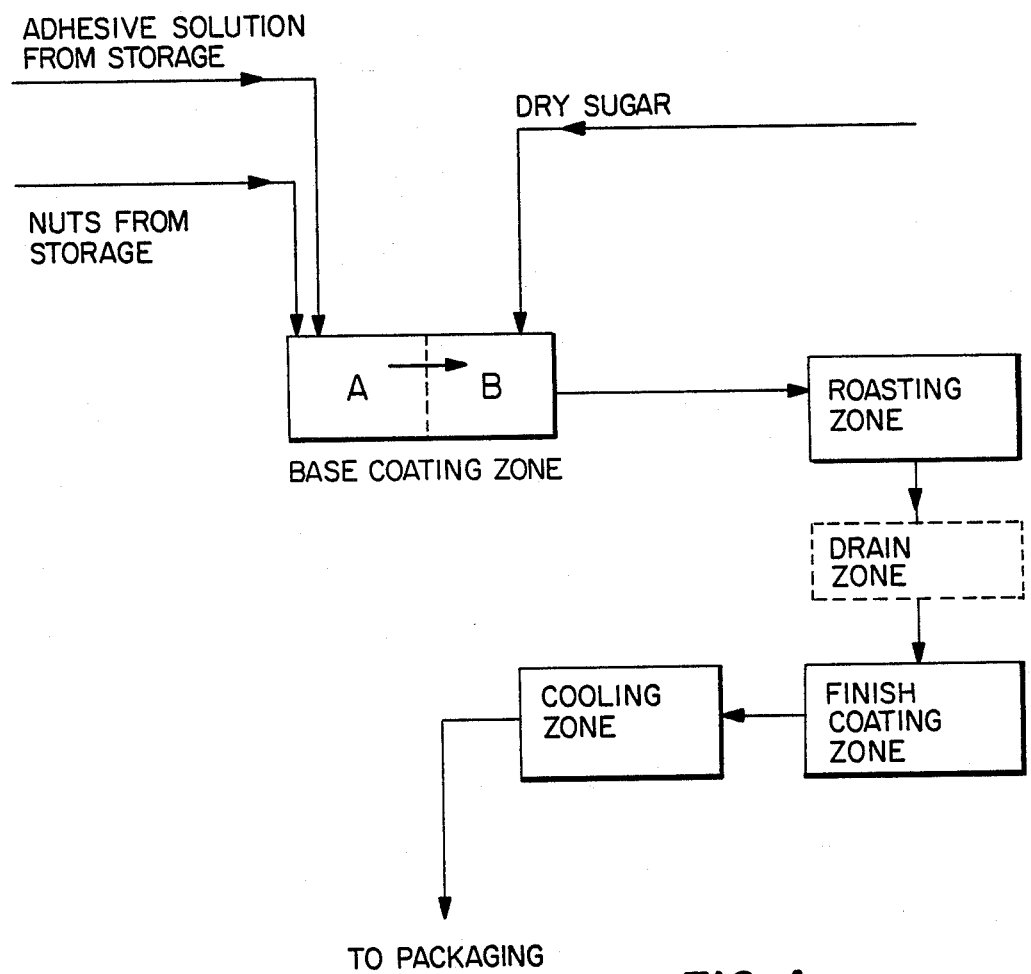
FIG. 1 is a flowsheet illustrating schematically one embodiment of the process of the invention.

The nuts which are treated in accordance with the invention can be any of those edible nuts which are conventionally packaged and sold as snack-type products or which are utilized for decoration and or as fillers in the confectionery and baked foods industry. Illustrative of such nut-meats are peanuts, cashews, almonds, walnuts, filberts, macadamia nuts, pecans, and the like. Particularly preferred products provided in accordance with the invention are those derived using peanuts and cashews as the starting materials.

The nuts are deshelled in a preliminary step and, optionally, may also be subjected to other conventional procedures such as blanching and the like prior to being subjected to the process of the invention. The term "raw nuts" is used hereinafter to refer to nuts in the form in which they are subjected to the first step of the process of the invention irrespective of what preliminary treatment, if any, has been applied to the nuts. Thus, white-roasted nuts and nuts which have been subjected to a process to remove a portion of their fat content are included within the meaning of this term. Typically, white-roasted nuts will have moisture contents above about 3%.

In an initial, liquid step of the process of the invention, the raw nuts are subjected to coating with an adhesive solution containing honey. The nut products prepared according to the present invention are, thus, honey-roasted because it is this adhesive solution containing honey which actually transfers the heat to the nuts to effect roasting, whether the coated nuts are roasted by immersion in oil (oil roasting) or by air convection (dry roasting). Unlike coatings of corn syrup alone which can overbrown during roasting and coatings of sucrose alone which tend to crystallize and become poorly adherent, the combination of sugars employed according to the present invention has a desirable combination of properties.

This initial, liquid coating step is accomplished using any conventional coating means employed in the art. Advantageously, the coating is accomplished in a conventional coating drum at a temperature of from about 140° F. to 200° F., preferably about 150° F. The nuts are introduced into the drum and an appropriate amount of the adhesive solution is introduced while providing agitation by rotating the drum at an appropriate speed until the nuts are uniformly coated with a layer of the adhesive solution. Alternatively, and preferably, particularly when the process is carried out on a continuous basis as described more fully hereafter, the nuts and the adhesive solution are introduced simultaneously in the appropriate proportions, and rotation of the drum is carried out as before until uniform coating is achieved. In general, the adhesive solution is employed in a proportion in the range of about 5 parts by weight to about 10 parts by weight, and preferably in the range of about 6 parts by weight to about 8 parts by weight, per 100 parts by weight of nuts.

One of the distinguishing features of the process of the invention lies in the nature and composition of the adhesive solution. The latter preferably comprises a mixture of honey, corn syrup, sucrose, a carbohydrate gum and water, none of which components is present in an amount in excess of 50 percent by weight of the total mixture. Advantageously, the proportion of these components lies within the following ranges (all percentages by weight of total mixture).

| Honey | 10 to 40 percent |
| Corn Syrup | 10 to 40 percent |
| Sucrose | 10 to 40 percent |
| Water | 10 to 20 percent |
| Carbohydrate Gum | 0 to 1.0 percent |

The percentage of water expressed above and hereafter is inclusive of any water introduced with the other components. Similar considerations apply to the percentage of sucrose.

Preferably the proportions of the above components lie within the following ranges of percentages by weight:

| Honey | 25 to 30 percent |
| Corn Syrup | 25 to 30 percent |
| Sucrose | 25 to 30 percent |
| Water | 12 to 16 percent |
| Carbohydrate Gum | 0.05 to 0.20 percent |

In a particularly preferred embodiment, the proportions in percentages by weight of the honey, corn syrup and sucrose are substantially identical and are of the order of about 27 to 29 percent by weight, the balance of the adhesive solution being water.

Other optional additives may be present in the adhesive solution in minor amounts, generally less than about 10 percent by weight of the total solution. Illustratively, natural or derived carbohydrate gums such as xanthan gum, gum arabic, guar gum, locust bean gum and the like can be present in the adhesive solution in amounts up to about 1.0 percent by weight. Preferably, xanthan gum will be employed at a level of about 0.10 to 0.18 percent.

The adhesive solution is preferably prepared by first preparing an aqueous mixture of the xanthan or other gum and then blending this with the honey and corn syrup and the sucrose, preferably in the form of a fruit granular grade. The resulting mixture is then heated with agitation to a temperature on the order of from about 150° F. to about 180° F., and preferably from about 160° F. to about 170° F., until complete solution is achieved. If desired, the heating of the syrup can be continued at a sufficiently high temperature to remove some of the water and increase the viscosity and or specific gravity of the adhesive solution to any desired value. Advantageously, the viscosity of the adhesive solution is within the range of about 1200 to about 1800 cps as measured on a Brookfield RVT helipath viscometer using a number 1 spindle. The specific gravity of the adhesive solution is advantageously within the range of about 1.27 to about 1.28.

After the nuts have been uniformly coated with the adhesive solution in the manner described above, they are then subjected to a further, dry coating operation in which they are enrobed with dry particulate sugar. This dry coating can be applied using conventional coating means such as the coating drum described above in regard to the liquid coating step. Indeed, it can be carried out immediately after the liquid coating operation is completed and while the nuts are still present in the coating apparatus employed therefor.

In a particular embodiment, which is employed advantageously when the process of the invention is being operated on a continuous basis, the two coating operations are carried out sequentially in a single coating drum which is inclined and/or provided with means such as a helical auger for advancing the nuts along the length of the drum as the latter is rotated. The adhesive solution is applied to the nuts in a first zone of such a device and, after the nuts have been uniformly coated, the dry granular sugar is introduced in a second zone of the device. The residence time of the nuts in such a coating device is adjusted, advantageously by adjusting the speed of rotation of the drum or its angle to the horizontal, so as to provide adequate time for each coating to be accomplished uniformly and completely.

Any of the commonly used forms of granulated sugar can be employed in this dry coating step. Illustrative of such sugars are number X powdered sugar. Advantageously, the sugar employed preferably has an average particle size from about 40 to about 140 US mesh.

The dry granular sugar is applied to the adhesive coated nuts in a proportion which is advantageously in the range of about 6 to about 12 parts per 100 parts by weight of nuts, and preferably within the range of about 8 to about 10 parts per 100 parts by weight of nuts.

When the dry coating operation has been completed, the coated nuts are subjected to roasting using procedures which may vary depending upon the particular type of raw nut which is being processed. Typically, the nuts are roasted in an edible oil such as refined peanut oil at a temperature in the range of about 300° F. to about 330° F., preferably from about 315° F. to about 325° F., and for a time which will vary depending upon the particular type of nut being processed and upon the temperature of roasting and the degree of roasting desired. Illustratively, the time and extent of roasting will be greater in the case of peanuts (from about 4.5 to about 7 minutes) than in the case of cashews (from about 1.5 to about 3.5 minutes). The most appropriate roasting conditions to be adopted in any particular instance can be determined readily by a process of trial and error.

The roasting operation can be conducted on a batch or continuous basis. In the case of a continuous oil roasting operation the nuts are retained on a continuous web of wire mesh fabricated from stainless steel or the like and transported on a continuous basis through a bath of the edible oil heated to a temperature within the range set forth above. The residence time of the nuts in the bath is adjusted to provide the desired time of roasting. The roasted nuts, whether roasted on a continuous or batch basis, are then passed to the final coating stage of the process of the invention. Preferably, any excess oil remaining on the nuts after the roasting step has been completed is allowed to drain off before subjecting the roasted nuts to this final coating stage. At this point in the process, the nuts are preferably cooled sufficiently to promote crystallization to prevent a glossy exterior which affects the product appearance and sometimes affects stickiness.

In the case of air (dry) roasting, the coated nuts are typically conveyed by continuous belt conveyor or like means, to the roasting zone wherein the coated nuts are heated in a gas fired roaster for a predetermined period of time and at a temperature in the range of about 280° F. to about 325° F. As discussed above, the precise range of temperature employed in any given instance depends upon the particular nut being treated. The apparatus employed can be any of the dry roasting devices known in the art which are capable of operation on a continuous basis. In general the residence time of the coated nuts in the dry roasting zone varies within the range of about 15 to about 30 minutes depending upon the particular type of nut being treated. Illustratively, the longer residence times within the above range are appropriate when peanuts are being subjected to the process of the invention whereas the shorter residence times are appropriate for cashew nuts.

During roasting, the combined coating on the nuts will become tacky and this tackiness is used to advantage to adhere a finish coating mixture to the nuts. In the finish coating stage, a dry mixture of sucrose and salt is applied to the nuts to provide a uniform coating thereon. This operation is accomplished using any conventional coating means, such as those described above, and is carried out in a continuous or in a batch procedure, preferably, shortly after the roasting step.

The dry mixture employed in this finish coating operation advantageously comprises from about 2 to about 3 parts, and preferably about 2½ parts by weight of sucrose to each part of salt. Any of the forms of sucrose available commercially can be employed. Sucrose of the grade known as fruit granular has been found to be particularly adapted for use in the dry mixture employed in this stage. The salt is also preferably of fine granulation, the grade known as flour salt being suitable. The dry mixture advantageously has a particle size of about 40 US mesh to about 140 US mesh.

The proportions in which the dry mixture of sucrose and salt are applied in this finish coating step are advantageously in the range of about 4 parts to about 6 parts, and preferably from about 5.0 parts to about 5.5 parts by weight per 100 parts by weight of nuts.

When the finish coating operation has been completed, the resulting coated and roasted nuts are cooled or allowed to cool, if necessary, to ambient temperature and then packaged in any appropriate manner for marketing.

The nuts which are prepared in accordance with the invention are characterized by a thick, adherent coating having a honey flavor note and otherwise good roasted flavor; an attractive appearance in terms of color and surface, the surface being non-glossy, but free from substantial granulation; a highly desirable crunchy texture; and good freedom from nut-to-nut clumping.

The flowsheet shown in FIG. 1 illustrates a continuous process for providing honey-roasted nuts in accordance with the invention. In the first step of this process raw nuts and an adhesive solution, prepared as described above, are conveyed by appropriate means from storage facilities (not shown) and are introduced continuously and in the desired proportions to the BASE COATING ZONE via an entry port in the first section (A). The first coating section comprises any mechanical continuous coating means commonly employed in the coating art. Illustrative of such coating apparatus are revolving coating drums in which the nuts are caused to tumble to provide even distribution of the adhesive solution over the surface of the raw nuts. Advantageously, the coating apparatus takes the form of a cylindrical coating drum mounted with its longitudinal axis aligned at a slight angle to the horizontal with the entry port at the elevated end and adapted to rotate at any desired rate to impart a tumbling action to the nuts and to cause the nuts to be advanced at any desired rate towards the exit port of the device.

Alternatively, the coating apparatus employed in the first section comprises an open trough having a semi-circular cross-section and provided with agitating and advancing means such as a rotating helical auger which imparts the tumbling action necessary to ensure uniform coating to the nuts and, at the same time, causes the nuts to be conveyed along the length of the coating zone at a rate effective to assure uniform, suitably tacky surface to enable pickup of the dry coating. A particularly useful type of agitating and propulsion means is that which is available under the trade mark Thermascrew from Bepex. This device provides agitation and product advancement and also serve to provide heat to the nuts, if desired. Advantageously, the nuts and or the adhesive solution are preheated to a temperature in the range of about 140° F. to about 200° F., preferably from about 150° F. to about 170° F. prior to introduction into the first coating section (A).

When the adhesive solution and the nuts have been blended sufficiently to provide a uniform coating of the solution on the nuts, the dry coating operation is commenced. In this operation the stream of adhesive coated nuts encounters a continuous stream of dry granular sugar (as hereinbefore described) which is introduced by appropriate conveyor means into the BASE COATING ZONE at a rate which is adjusted to provide the desired proportion of sugar to nuts as discussed above. This application of the stream of dry sugar can be accomplished preferably in a later section (B) of the same coating apparatus as that employed in the continuous application of the adhesive solution. Alternatively, the continuous application of the dry sugar stream can be performed in a separate coating apparatus to which the stream of adhesive coated nuts is conveyed by means such as a continuous conveyor belt or mesh. When such a separate coating apparatus is employed it can take the form of any of the apparatus described and exemplified in reference to the apparatus used in the dry coating step.

The rate of continuous passage of the nuts through the second coating section (B), whether this section forms part of the same coating apparatus as section (A) or is a separate coating apparatus, is adjusted so as to permit the uniform application of a coating of dry sugar to the nuts prior to removal of the coated nuts from the BASE COATING ZONE. Advantageously, the rate of passage of the nuts is adjusted so that the total residence time of the nuts in sections (A) and (B) is on the order of about 1 minute to about 2 minutes, and preferably from about 1.5 minutes to about 1.75 minutes.

The coated nuts emerging on a continuous basis from the BASE COATING ZONE are then conveyed, by continuous belt conveyor or like means, to the ROASTING ZONE wherein the coated nuts are subjected to roasting such as in an edible oil such as peanut oil for a predetermined period of time and at a temperature in the range of about 300° F. to about 330° F. As discussed above, the precise range of temperature employed in any given instance depends upon the particular nut being treated. The apparatus employed in the ROASTING ZONE can be any of the oil roasting devices known in the art which are capable of operation on a continuous basis. Such devices generally comprise a continuous wire mesh conveyor on to which the coated nuts are dispensed in a continuous stream and which then conveys the nuts through a bath containing the edible oil maintained at the desired temperature. The rate at which the conveyor moves continuously through the bath is adjusted so that the desired residence time of the nuts in the oil bath is achieved. In general the residence time can vary within the range of about 1.5 to about 7 minutes depending upon the particular type of nut being treated. Illustratively, the longer residence times within the above range are appropriate when peanuts are being subjected to the process of the invention whereas the shorter residence times are appropriate for cashew nuts.

The continuous flow of roasted nuts emerging from the ROASTING ZONE is then discharged onto a continuous belt conveyor or like conveying means and transferred to the FINISH COATING ZONE. In a particular embodiment, the roasted nuts emerging from the ROASTING ZONE remain on the wire mesh conveyor belt, while the latter is still in motion, for a short period of time, advantageously of the order of about 0.5 to about 2.0 minutes, to allow excess oil to drain from the nuts prior to the point at which the nuts are discharged onto the continuous belt conveyor for transfer to the FINISH COATING ZONE. The latter ZONE comprises a continuous coating means, such as are described and exemplified above into which the continuous stream of nuts and a continuous stream of a dry mixture of sugar and salt, the nature and composition of which has been discussed above, are fed in appropriate proportions which have also been discussed above.

In a preferred embodiment, the average temperature of the nuts for passage through the FINISH COATING ZONE is brought to within the range about 180° F. to about 230° F., preferably about 190° F. to about 210° F., by passing a stream of ambient air through the continuous stream of nuts, preferably conveyed on a foraminous belt. The cooling should be effective to provide a slight grainy appearance. If too hot, the nuts will have a glossy candy appearance; and, if too cool, the product will have a dusty appearance and may cause excessive coating loss during normal commercial shipping and handling. In a further preferred but optional step in the process of the invention, the continuous flow of nuts being transferred from the ROASTING ZONE to the FINISH COATING ZONE is subjected to an additional operation designed to effect separation or singularization of the individual nuts. This can be achieved in a convenient manner by operating the belt conveyor, onto which the flow of nuts is discharged from the ROASTING ZONE, at a faster rate than the mesh conveyor belt on which the nuts have been transported through the latter ZONE. The resulting sudden acceleration in rate of movement of the nuts serves to achieve the desired separation.

In an optional but desirable final step of the process of the embodiment of the invention as illustrated in FIG. 1 the stream of roasted, coated nuts is discharged from the FINISH COATING ZONE onto a continuous belt or like transporting means and passed through a COOLING ZONE in which the temperature of the nuts is reduced to a temperature below 100° F. This operation serves to ensure that excessive roasting of the nuts does not occur in storage bins due to maintenance at high temperature. It is also found that the tendency of the treated nuts to adhere to each other, especially upon storage, is greatly reduced if not eliminated by passage through the COOLING ZONE. The latter ZONE advantageously comprises a closed or partially closed area through which filtered ambient air is caused to flow at a rate sufficient to achieve the desired reduction in temperature. The efficiency of this cooling step is greatly enhanced by transporting the nuts through the ZONE on a conveyor belt which is perforated to permit passage therethrough of cooling air or inert gas. A particularly preferred embodiment employs a continuous wire mesh belt conveyor thereby permitting maximum contact between cooling gas and the nuts.

The stream of treated nuts emerging from the COOLING ZONE is then collected and transported by any appropriate means to a packaging station (not shown) where packaging of the nuts by any appropriate and conventional means is accomplished.

The following non-limiting Examples illustrate processes for the continuous production of honey roasted nuts in accordance with the embodiment shown in FIG. 1 and discussed above.

EXAMPLE 1

A coating syrup is prepared from the following ingredients and proportions (all parts by weight).

| | Parts |
|---|---|
| Honey (83% solids) | 28.65 |
| Corn Syrup, 42 DE/43° Baume (80% solids) | 28.65 |
| Sucrose (fruit granular) | 28.54 |
| Water | 14.05 |
| xanthan gum | 0.11 |

The xanthan gum is dispersed in the water with vigorous agitation for about 5 minutes and allowed to hydrate for another 25 minutes prior to admixture with the honey, corn syrup and sugar which are blended with the resulting dispersion with agitation as required. The resulting mixture is heated with stirring, to a temperature of approximately 160° F.

A continuous stream of blanched peanuts (Jumbo Runners) is introduced at a rate of 100 lbs per minute to one end of a continuous coating apparatus comprising a drum rotating at a rate of about 8 rpm at an angle of about 6° to the horizontal. Simultaneously, a continuous stream of the above syrup (at a temperature of about 150° F.) is introduced onto the nuts at the entrance location of the coating apparatus at a rate of about 6 parts by weight per 100 parts by weight of the nuts. The nuts are continuously agitated and advanced through the drum and are found to be uniformly coated with syrup solution at a point which is approximately half way along the length of the apparatus. At about or shortly beyond this point, a continuous stream of dry particulate sugar (fruit granular; average particle size of 40 to 140 US mesh) is introduced at a rate corresponding to a proportion of 8 parts per 100 parts of nuts. By the time the resulting nuts reach the exit port of the coating apparatus each nut has been provided with a uniform coating of the sugar. The average residence time of the nuts in the coating apparatus is about 1.5 minutes, of which about 1.0 minute is the average residence time in the syrup coating section and the remainder is the residence time in the sugar coating section.

The stream of coated nuts emerging from the coating apparatus is discharged onto a continuously moving wire mesh belt (speed about 1 ft/minute) and transported through a Stein continuous oil roaster where the nuts are roasted in refined peanut oil maintained at a temperature of 320° F. The average residence time of the nuts in the hot oil is approximately 5.75 minutes and, after emerging from the hot oil, the nuts are permitted to drain on the moving belt for approximately 45 seconds before being discharged onto another continuously moving conveyor belt. The latter is moving at a rate of about 7 ft/minute, i.e., more rapidly than the belt on which the nuts were previously travelling. The nuts are thereby caused to separate and singularize as they impact on the more rapidly moving belt conveyor. This conveyor then transports the continuous stream of nuts to a continuous finish coating drum, the transfer time being about 30 seconds during which cooling of the nuts is achieved by contact with a current of air under ambient conditions (ca 80° F. and 60% relative humidity).

The finish coating drum is rotating at about 8 rpm and the nuts are caused to pass therethrough in an average residence time of about 5 seconds. Continuous streams of fruit granular sucrose and flour salt (flour designates particle size, not composition) are introduced at the entry port of the coating drum at a sugar to salt ratio of 2.5:1 and a combined rate corresponding to about 5 parts by weight of sugar and salt per 100 parts by weight of nuts. The nuts become uniformly coated with the dry mixture and are continuously discharged from the exit port of the coating drum onto a continuous belt conveyor. The latter transports the resulting honey roasted nuts through a zone in which the nuts are subjected to cooling by a current of air at ambient temperature (ca 80° F.). The average residence time of the nuts in the zone is about 10 minutes and the temperature of the nuts emerging from this zone is about 95° F. The honey roasted nuts are then transferred to a packaging station and sealed in predetermined quantities in containers for distribution.

Samples of the resulting nuts are subjected to examination by a panel of tasting experts and rated as exhibiting excellent flavor, aroma and texture as well as very attractive eye appeal. The salt content is found to be about 1.2 percent by weight and the moisture content is about 1.7 percent by weight. Employing an Agtron color photometer in tee green mode using the 0 and 33% plates to define the scale, a reflectance value of about 35-45 is found for the whole nuts and a reflectance value of about 50-70 is found for the nuts after coarse grinding.

EXAMPLE 2

The above procedure is repeated exactly as described, using cashew nuts in place of the peanuts and employing a temperature of about 305° F. and a residence time of 4.5 minutes in the oil roasting stage. The honey roasted cashews so obtained are found to have a salt content of about 1.2% w/w, and a moisture content of about 1.7% w/w. Employing an Agtron color photometer in the green mode using the 0 to 33 plates to define the scale, a reflectance value of about 35-45 is found for the whole nuts and a reflectance value of 70-90 is found for the nuts after coarse grinding.

It is to be understood that the above Examples are given by way of illustration only and are not to be construed as limiting the scope of the invention which is defined by the following claims.

What is claimed is:

1. A process for preparing honey-roasted nuts which comprises the steps of: coating raw nuts with an adhesive comprising a mixture of about 10 to about 40 percent by weight of honey, about 10 to about 40 percent by weight of corn syrup, about 10 to about 40 percent by weight of sucrose and about 10 to about 20 percent by weight of water; applying a coating of particulate sugar to said adhesive coated nuts; subjecting the resulting coated nuts to roasting; subjecting the roasted nuts to cooling under conditions effective to promote crystallization of the coating; and applying to the nuts, after the cooling step, a dry finish coating comprising a mixture of sugar and salt.

2. A process according to claim 1 wherein the dry finish coating consists of sugar and salt.

3. A process according to claim 1 wherein the honey, corn syrup and sucrose are all present in an amount of about 27 to about 29 percent by weight and the balance of the adhesive is water.

4. A process according to claim 1 wherein said nuts are roasted in an edible oil at a temperature in the range of about 300° to about 330° F.

5. A process according to claim 4 which comprises the additional step of applying to the nuts, after the roasting step, a dry coating comprising a mixture of sugar and salt.

6. A process according to claim 5 wherein the honey, corn syrup and sucrose are all present in about equal weights.

7. A process according to claim 6 wherein the adhesive comprises from about 25 to about 30 percent by weight of honey, from about 25 to about 30 percent by weight of corn syrup, from about 25 to about 30 percent by weight of sucrose, and from about 10 to about 20 percent by weight of water.

8. A process according to claim 1 wherein the adhesive also comprises a minor amount of a gum.

9. A process according to claim 8 wherein said gum is xanthan gum.

10. A process according to claim 1 wherein the adhesive is applied to the nuts in an amount of about 6 to about 8 parts by weight per 100 parts by weight of nuts.

11. A process according to claim 1 wherein the particulate sugar is applied to the adhesive coated nuts in an amount of about 8 to about 10 parts by weight per 100 parts by weight of adhesive coated nuts.

12. A process according to claim 2 wherein the mixture of sugar and salt contains from about 2 to about 3 parts by weight of sugar for each part of salt.

13. A process for preparing honey-roasted nuts which comprises the steps of: coating raw nuts with an adhesive comprising a mixture of from about 10 to about 40% each of honey, corn syrup, and sucrose and a minor amount of gum in an amount of from about 6 to about 8 parts by weight per part of nuts; applying a coating of particulate sugar to said adhesive-coated nuts; subjecting the resulting coated nuts to roasting in an edible oil at a temperature in the range of about 300° to about 330° F.; and applying to the nuts, after the roasting step, a dry finish coating comprising a mixture of sugar and salt, at a ratio of sugar to salt within the range of from about 2:1 to about 3:1.

14. A process according to claim 13 wherein the adhesive comprises from about 25 to about 30 percent by weight of honey, from about 25 to about 30 percent by weight of corn syrup, from about 25 to about 30 percent by weight of sucrose, and from about 10 to about 20 percent by weight of water.

15. A process according to claim 14 wherein the honey, corn syrup and sucrose are all present in an amount of about 27 to about 29 percent by weight and the balance of the adhesive is water.

16. A process for preparing honey-roasted nuts which comprises the step of: continuously feeding raw nuts through a BASE COATING ZONE; uniformly coating said nuts with an aqueous adhesive solution comprising a mixture of about equal weights of honey, corn syrup, and sucrose and water during passage of said nuts through a first section of said BASE COATING ZONE; uniformly coating said adhesive coated nuts with dry particulate sugar in a second section of said BASE COATING ZONE; continuously conveying said adhesive and sugar coated nuts through a zone in which said nuts are roasted in edible oil at a temperature of about 300° to about 330° F.; continuously conveying the resulting roasted nuts through a FINISH COATING ZONE and uniformly applying thereto a finish coating of a dry mixture of sugar and salt; and thereafter continuously conveying said treated nuts through a cooling zone.

17. A process according to claim 16 wherein said adhesive solution employed in said first BASE COATING ZONE comprises from about 25 to about 30 percent by weight of honey, from about 25 to about 30 percent by weight of corn syrup, from about 25 to about 30 percent by weight of sucrose, and from about 10 to about 20 percent by weight of water.

18. A process according to claim 17 wherein the adhesive solution employed in said BASE COATING ZONE also comprises a minor amount of a gum.

19. A process according to claim 18 wherein the adhesive solution employed in said BASE COATING ZONE is applied to the nuts at a rate of about 6 to about 8 parts by weight per 100 parts by weight of nuts.

20. A process according to claim 19 wherein the dry particulate sugar employed in said second section of the BASE COATING ZONE is applied at a rate of about 8 to about 10 parts by weight per 100 parts by weight of nuts.

21. A process according to claim 20 wherein the dry mixture of sugar and salt employed in said FINISH COATING ZONE is applied at a sugar to salt ratios of from about 2:1 to about 3:1.

22. A process according to claim 21 wherein the residence time in said oil roasting zone is within the range of about 4 to about 7 minutes.

23. A process according to claim 22 which comprises the additional step of conveying the nuts emerging from the oil roasting zone through a zone in which excess oil is permitted to drain from said nuts prior to entry of said nuts into the FINISH COATING ZONE.

24. A process according to claim 23 wherein prior to entering said FINISH COATING ZONE said nuts are cooled to a temperature between about 180° F. and 230° F.

* * * * *